(No Model.)
W. FOWLER.
ELECTRICALLY ARRANGED HOSE COUPLING.
No. 539,017. Patented May 7, 1895.
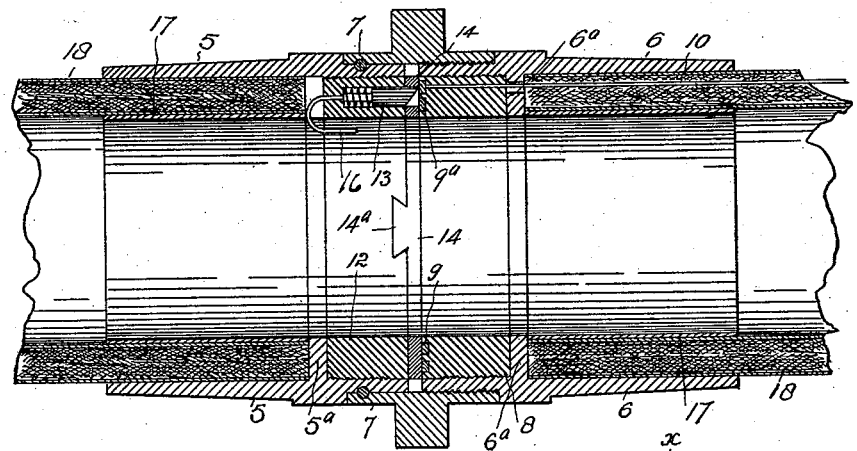
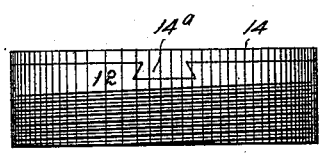
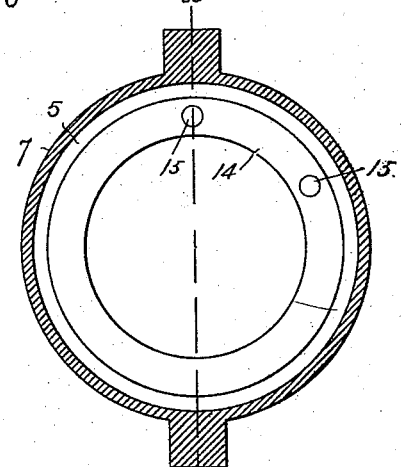
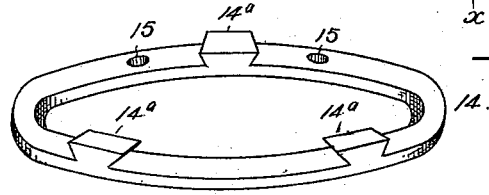
WITNESSES:
INVENTOR
W. Fowler.
BY
ATTORNEY

UNITED STATES PATENT OFFICE.

WILLIAM FOWLER, OF COLORADO SPRINGS, COLORADO.

ELECTRICALLY-ARRANGED HOSE-COUPLING.

SPECIFICATION forming part of Letters Patent No. 539,017, dated May 7, 1895.

Application filed November 30, 1894. Serial No. 530,497. (No model.)

*To all whom it may concern:*

Be it known that I, WILLIAM FOWLER, a citizen of the United States of America, residing at Colorado Springs, in the county of El Paso and State of Colorado, have invented certain new and useful Improvements in Electrically-Arranged Hose-Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in hose couplings for use in connection with electrical signaling apparatus and consists of the features hereinafter described and claimed, all of which will be fully understood by reference to the accompanying drawings, in which is illustrated an embodiment thereof.

In the drawings, Figure 1 is a face view of the coupling part carrying the gasket applied to the insulating-ring. Fig. 2 is a detail elevation of the insulating-ring carrying the gasket. Fig. 3 is a longitudinal section taken through the two coupling parts connected in operative relation. This view is taken on the line $x\ x$, Fig. 1. Fig. 4 is a detail view in perspective, showing the rubber gasket.

In an ordinary hose coupling, the gasket engages a circumferential groove formed in the swivel ring and therefore moves with said ring until the opposite coupling part engages the gasket and presses against it with sufficient force to stop its movement.

The improvement set forth in this present application is specially designed for use in connection with electrically arranged couplings having contact pins or plugs forming a part of the circuit, which pins or plugs must pass through the gasket of the coupling. This class of couplings is shown in my previous application, Serial No. 515,208, filed June 20, 1894. If, in this class of couplings, the gasket were carried by the swivel ring, the friction of said ring on the gasket (held stationary by the contact pins) would have a tendency to wrinkle or double up the gasket and prevent or hinder the contact parts from properly forming the circuit through the coupling. In my improved construction, the gasket is attached to the insulating ring of the coupling whereby it is disconnected from the swivel ring and removed from all possibility of disarrangement therefrom.

Having thus outlined the invention and its function, I will now describe the same in detail, similar reference characters indicating corresponding parts in the several views of the drawings.

Let the numerals 5 and 6 designate the metal coupling parts. To the part 5 is suitably attached the swivel ring 7 which is threaded to receive the metal coupling part 6 which carries an insulating ring 8, in the face of which are set the two metal contact rings 9 and $9^a$ to which lead the conductors 10 (one only being shown) carried by the hose. The insulating ring 8 is screwed to its corresponding coupling part, and the conductors 10 pass directly through said ring 8 to their corresponding contact rings 9 and $9^a$. The insulating ring 12 is also exteriorly threaded and screwed into the coupling part. The coupling parts 5 and 6 are provided with interiorly projecting circumferential shoulders $5^a$ and $6^a$ respectively. These shoulders are preferably formed integral with their respective coupling parts and form stops for the insulating rings whereby the latter are held securely in place. Each contact plug 13 is located in a recess formed in the insulating ring 12, and is shouldered to engage a coil spring $13^a$ which is located within the recess surrounding the reduced portion of the plug. The spring normally forces the plug outward and causes it to protrude from the insulating ring whereby the plug is adapted to engage the corresponding contact ring of the opposite coupling part.

The shoulder $5^a$ as shown in the drawings, is cut away to make room for the conductors 16 connected with the contact plugs; while the shoulder $6^a$ is apertured to allow the conductors 10 to pass therethrough. Within the coupling parts 5 and 6, and to the rear of the insulating rings, are located the ordinary expansion rings 17 which engage and lock the hose extremities 18 within the coupling.

The rubber gasket 14 may be attached to the face of the insulating ring 12 in any suitable manner, and is provided with apertures 15 through which the contact plugs 13 pass. As shown in the drawings, the gasket is provided on its inner surface with lugs 14ᵃ having a dovetail shape and adapted to engage counterpart recesses formed in the engaging face of the insulating ring 12. By reason of this construction, the gasket may be readily removed when the parts are uncoupled, but cannot get out of place during use, or become disarranged during the operation of coupling or connecting the two parts 5 and 6 of the hose coupling.

Having thus described my invention, what I claim is—

1. In an electrical hose coupling, the combination with the coupling part having an insulating ring attached thereto and contact plugs or pins passing therethrough, of a gasket composed of rubber or other suitable material having apertures to receive the contact pins or plugs, the gasket being attached to the insulating ring by means of lugs or projections formed on one part and engaging recesses formed in the other part substantially as described.

2. In an electrically arranged hose coupling, the combination with the coupling part having an insulating ring, of the gasket suitably attached to the insulating ring of the coupling part, by means of lugs or projections formed on one part (the insulating ring or the gasket) and engaging recesses formed in the other part, substantially as described.

3. In an electrically arranged coupling having an insulating ring attached thereto, the gasket having dovetailed projections adapted to engage counterpart recesses formed in the face of the insulating ring, substantially as described.

In testimony whereof I affix my signature in the presence of two witnesses.

WILLIAM FOWLER.

Witnesses:
GEORGE W. MUSSER,
LUCIUS C. PERKINS.